(12) United States Patent
Zhang et al.

(10) Patent No.: US 12,256,854 B2
(45) Date of Patent: Mar. 25, 2025

(54) BEVERAGE BREWING POT AND BEVERAGE BREWING METHOD USING SAME

(71) Applicant: Weidong Zhang, Guangdong (CN)

(72) Inventors: Weidong Zhang, Guangdong (CN); Wenbiao Xiao, Guangdong (CN)

(73) Assignee: Weidong Zhang, Foshan (CN)

( * ) Notice: Subject to any disclaimer, the term of this patent is extended or adjusted under 35 U.S.C. 154(b) by 665 days.

(21) Appl. No.: 17/354,054

(22) Filed: Jun. 22, 2021

(65) Prior Publication Data

US 2021/0386225 A1 Dec. 16, 2021

Related U.S. Application Data

(63) Continuation of application No. PCT/CN2019/086080, filed on May 8, 2019.

(30) Foreign Application Priority Data

Jan. 15, 2019 (CN) .......................... 201910036675.4

(51) Int. Cl.
*A47G 19/14* (2006.01)
*A47J 31/20* (2006.01)
(Continued)

(52) U.S. Cl.
CPC .............. *A47G 19/14* (2013.01); *A47J 31/20* (2013.01); *A47J 31/468* (2018.08); *A47J 31/525* (2018.08); *A23F 3/18* (2013.01); *A23F 5/26* (2013.01)

(58) Field of Classification Search
CPC .... A47G 19/14; A47G 19/16; A47G 19/2205; A47J 31/20; A47J 31/468; A47J 31/525;
(Continued)

(56) References Cited

U.S. PATENT DOCUMENTS 3,181,951 A * 5/1965 Gronvold ................ A47J 31/20
99/320
3,650,201 A * 3/1972 Jovanovic ............. A47J 31/002
99/279

(Continued)

FOREIGN PATENT DOCUMENTS

CN 201398778 Y 2/2010
CN 201683238 A 12/2010
(Continued)

*Primary Examiner* — Drew E Becker
*Assistant Examiner* — Luis Eugenio Diou Berdecia

(57) ABSTRACT

A beverage brewing pot and a beverage brewing method using the same. The brewing pot includes a first pot liner, a second pot liner, a water-air pump and a controller. A brewing chamber is arranged between the first pot liner and the second pot liner. The first pot liner, the second pot liner and the brewing chamber are in communication. At least the first pot liner is sealed during operation. A first water-level sensor is provided at the top of the first pot liner, and a second water-level sensor is provided at the top of the second pot liner. The controller controls the water-air pump to feed air to the first pot liner to direct the water to flow into the second pot liner. The controller controls the water-air pump to operate reversely, such that the water in the second pot liner is pumped back to the first pot liner.

4 Claims, 14 Drawing Sheets

(51) Int. Cl.
  *A47J 31/46* (2006.01)
  *A47J 31/52* (2006.01)
  *A23F 3/18* (2006.01)
  *A23F 5/26* (2006.01)

(58) Field of Classification Search
  CPC ...... A47J 31/32; A47J 31/005; A47J 31/3676; A47J 31/46; A47J 41/00; A47J 41/0077; A23F 3/18; A23F 5/26; A23F 5/262; B65D 81/3869
  USPC .......................................... 426/231; 99/275
  See application file for complete search history.

(56) References Cited

U.S. PATENT DOCUMENTS

| | | | | |
|---|---|---|---|---|
| 4,327,632 | A * | 5/1982 | Batty | A47J 31/20 99/320 |
| 4,512,246 | A * | 4/1985 | Chappell | B67D 1/0425 99/280 |
| 5,049,713 | A * | 9/1991 | Creyaufmuller | A47J 31/547 426/241 |
| 5,312,014 | A * | 5/1994 | Hamlin | A47G 19/2272 220/717 |
| 5,434,392 | A * | 7/1995 | Belinkoff | A47J 31/547 99/302 R |
| 5,531,353 | A * | 7/1996 | Ward | A47J 41/0083 220/729 |
| 5,632,193 | A * | 5/1997 | Shen | A47J 31/02 99/305 |
| 5,799,566 | A * | 9/1998 | Breinlinger | A47J 31/20 99/320 |
| 5,880,441 | A * | 3/1999 | Hartman | A47J 31/547 219/689 |
| 5,902,620 | A * | 5/1999 | Nolan | A47J 31/303 99/302 R |
| 7,217,434 | B1 * | 5/2007 | Loh | B65D 81/3205 206/217 |
| 7,895,939 | B2 * | 3/2011 | Pan | A47J 31/005 99/322 |
| 9,516,974 | B2 * | 12/2016 | Herling | A47J 31/20 |
| 9,681,771 | B2 * | 6/2017 | Herling | A47J 31/18 |
| 9,688,445 | B2 * | 6/2017 | Ayres | B65D 81/3876 |
| 9,717,365 | B2 * | 8/2017 | Geissler | A47J 31/32 |
| 2002/0152895 | A1 * | 10/2002 | Duffy | A47J 31/0642 99/279 |
| 2003/0157224 | A1 * | 8/2003 | Westerhof | A47G 19/02 426/394 |
| 2005/0284302 | A1 * | 12/2005 | Levin | A47J 31/005 99/275 |
| 2005/0284303 | A1 * | 12/2005 | Zell | A47J 41/0011 99/279 |
| 2006/0107839 | A1 * | 5/2006 | Nenov | A47J 31/36 99/275 |
| 2007/0101868 | A1 * | 5/2007 | Porter | A47J 31/005 99/275 |
| 2007/0221067 | A1 * | 9/2007 | Scelza | A47J 31/0576 99/279 |
| 2009/0136639 | A1 * | 5/2009 | Doglioni Majer | A47J 31/5255 99/302 R |
| 2009/0246341 | A1 * | 10/2009 | Pitner | A23F 3/16 99/298 |
| 2010/0116142 | A1 | 5/2010 | Versini | |
| 2011/0064852 | A1 | 3/2011 | Mann | |
| 2011/0072979 | A1 * | 3/2011 | Fogg, IV | A47J 36/2466 99/302 R |
| 2012/0269025 | A1 * | 10/2012 | Liu | B01F 27/2122 366/129 |
| 2013/0078342 | A1 * | 3/2013 | Loebl | B65D 85/8067 426/433 |
| 2013/0101715 | A1 * | 4/2013 | Geissler | A47J 31/32 426/431 |
| 2013/0239821 | A1 * | 9/2013 | Boettcher | A47J 31/20 99/317 |
| 2013/0312617 | A1 * | 11/2013 | Toporovsky | A47J 31/005 99/280 |
| 2014/0356501 | A1 * | 12/2014 | Juris | A23F 5/265 426/433 |
| 2016/0000253 | A1 * | 1/2016 | Song | A47J 31/005 99/295 |
| 2016/0353761 | A1 * | 12/2016 | Paul | A23F 5/262 |
| 2016/0360917 | A1 * | 12/2016 | Richardson | A47J 31/005 |
| 2016/0367072 | A1 * | 12/2016 | Boone | A47J 43/046 |
| 2017/0071396 | A1 * | 3/2017 | McLean | B01D 11/0253 |
| 2017/0099978 | A1 * | 4/2017 | Hyman | A47J 31/005 |
| 2017/0156540 | A1 * | 6/2017 | Wheatley | B67D 1/0078 |
| 2017/0295985 | A1 * | 10/2017 | Lin | A47G 19/22 |
| 2017/0303712 | A1 * | 10/2017 | Pisarevsky | A47J 31/32 |
| 2018/0078077 | A1 * | 3/2018 | Su | A47J 31/407 |
| 2018/0110363 | A1 * | 4/2018 | Glucksman | A47J 31/4403 |
| 2018/0139979 | A1 * | 5/2018 | Glynn | A23F 5/26 |
| 2018/0168385 | A1 * | 6/2018 | Boone | G06Q 30/0621 |
| 2018/0206666 | A1 * | 7/2018 | Kollep | A47J 31/407 |
| 2018/0263403 | A1 * | 9/2018 | Richardson | A47J 31/005 |
| 2018/0282178 | A1 * | 10/2018 | Poindexter | A47J 31/18 |
| 2018/0333007 | A1 * | 11/2018 | Ganahl | A47J 31/005 |

FOREIGN PATENT DOCUMENTS

| | | |
|---|---|---|
| CN | 201879306 U | 6/2011 |
| CN | 102648823 A | 8/2012 |
| CN | 206102267 U | 4/2017 |
| CN | 106974512 A | 7/2017 |
| CN | 107811508 A | 3/2018 |
| FR | 2879175 B1 | 11/2008 |
| FR | 2930522 A1 | 10/2009 |

* cited by examiner

BEVERAGE BREWING POT AND BEVERAGE BREWING METHOD USING SAME

CROSS-REFERENCE TO RELATED APPLICATIONS

This application is a continuation of International Patent Application No. PCT/CN2019/086080, filed on May 8, 2019, which claims the benefit of priority from Chinese Patent Application No. 201910036675.4, filed on Jan. 15, 2019. The content of the aforementioned application, including any intervening amendments thereto, is incorporated herein by reference in its entirety.

TECHNICAL FIELD

The disclosure relates to brewing pots, and specifically to a beverage brewing pot and a beverage brewing method using the same.

BACKGROUND

Generally, the coffee or tea is brewed by immersing the coffee bag or tea bag in boiling water in a brewing pot for a period of time to allow the flavor components to naturally release, and finally poured into a cup to be enjoyed. However, in the natural state without the water flow, the flavor components cannot experience an even dispersion in the brewing pot. Moreover, the accumulated coffee or tea grounds hinder the release of the flavor components, resulting in waste.

SUMMARY

In order to solve the above-mentioned technical problems, the disclosure provides a beverage brewing pot with simple structure and reasonable design, and an automated beverage brewing method using the same.

Technical solutions of this application are described as follows.

In a first aspect, this application provides a beverage brewing method using a beverage brewing pot, wherein the beverage brewing pot comprises a first pot liner, a second pot liner, at least one water-air pump and a controller; a brewing chamber is arranged between the first pot liner and the second pot liner; the first pot liner, the second pot liner and the brewing chamber are in communication; at least the first pot liner is in a sealed state in an operating state; a first water-level sensor is provided at a top of the first pot liner; a second water-level sensor is provided at a top of the second pot liner; a joint of an air outlet pipe of the water-air pump is connected to the first pot liner to feed air to the first pot liner; and the beverage brewing method comprises:

(1) placing a brewing substance in the brewing chamber;
(2) feeding water to the first pot liner or the second pot liner; and sealing the first pot liner; wherein a volume of the water is not more than 95% of a volume of the first pot liner or the second pot liner;
(3) simultaneously starting the controller and the at least water-air pump to feed air to the first pot liner in the sealed state such that the water in the first pot liner in the sealed state is directed to flow into the second pot liner;
(4) when the second water-level sensor of the second pot liner detects that water in the second pot liner rises to a designated water level, feeding back, by the second water-level sensor, a first signal to the controller; controlling, by the controller, the water-air pump to operate to allow the water in the second pot liner to flow back to the first pot liner; or controlling, by the controller, the water-air pump to allow air in the first pot liner to escape such that the water in the second pot liner returns to the first pot liner under an action of gravity;
(5) when the first water-level sensor of the first pot liner detects that water in the first pot liner rises to a designated water level, feeding back, by the first water-level sensor, a second signal to the controller; and controlling, by the controller, the water-air pump to feed air to the first pot liner to allow water in the first pot liner to flow into the second pot liner; and
(6) repeating steps (4)-(5) several times such that the brewing substance in the brewing chamber is fully soaked to release flavor components and is uniformly dispersed in water under action of water flow to produce a beverage.

In an embodiment, the first pot liner and the second pot liner both are sealed in the operating state; a joint of an inlet pipe of the water-air pump is communicated with the second pot liner; the joint of the outlet pipe of the water-air pump is communicated with the first pot liner; air and water in the first pot liner and the second pot liner all flow in an internal circulation manner; and in step (4), after the second water-level sensor feeds back the first signal to the controller, the controller controls the water-air pump to pump the water in the second pot liner back to the first pot liner.

In an embodiment, the water-air pump consists of a first water-air pump and a second water-air pump; the beverage brewing pot further comprises a first pipe and a second pipe; an air outlet of the first water-air pump is communicated with the first pot liner through the first pipe; an air inlet of the first water-air pump is communicated with the second pot liner through the first pipe; an air outlet of the second water-air pump is communicated with the second pot liner through the second pipe; an air inlet of the second water-air pump is communicated with the first pot liner through the second pipe;

the step (3) is performed through steps of:
starting the controller and the first water-air pump simultaneously to allow the first water-air pump to feed air to the first pot liner in the sealed state so as to direct water in the first pot liner to flow into the second pot liner;

the step (4) is performed through steps of:
when the second water-level sensor of the second pot liner detects that the water in the second pot liner rises to a designated water level, feeding back, by the second water-level sensor, the first signal to the controller; controlling, by the controller, the first water-air pump to stop operating, and controlling, by the controller, the second water-air pump to feed air to the second pot liner to direct the water in the second pot liner to flow back to the first pot liner; and the step (5) is performed through steps of:
when the first water-level sensor of the first pot liner detects that the water in the first pot liner rises to a designated water level, feeding back, by the first water-level sensor, the second signal to the controller; controlling, by the controller, the second water-air pump to stop operating, and controlling, by the controller, the first water-air pump to feed air to the first pot liner to direct the water in the first pot liner to flow into the second pot liner.

In an embodiment, the first pot liner and the second pot liner are arranged up and down, or left and right, or inside and outside.

In an embodiment, the first pot liner and the second pot liner are arranged up and down; in the operating state, the first pot liner is in a sealed state and the second pot liner is not sealed; and the controller is configured to control the water-air pump to allow air in the first pot liner to escape so that the water in the second pot liner returns to the first pot liner under action of gravity.

In a second aspect, this disclosure provides a beverage brewing pot used in the above brewing method, comprising:
the first pot liner;
the second pot liner;
the water-air pump; and
the controller;
wherein the first pot liner and the second pot liner are arranged up and down; the first pot liner is connected to a bottom of the second pot liner; the water-air pump is fixedly provided on a bottom of the first pot liner; the brewing chamber is arranged between the first pot liner and the second pot liner; the first pot liner, the second pot liner and the brewing chamber are in communication; at least the first pot liner is in a sealed state in the operating state; the top of the first pot liner is provided with the first water-level sensor; the top of the second pot liner is provided with the second water-level sensor; the joint of the air outlet pipe of the water-air pump is connected with an air supply pipe; the air supply pipe extends to be close to an inner top of the first pot liner, and is connected to the first pot liner in the sealed state during operation for air supply; the top of the second pot liner is provided with an air port which is not sealed, and the air port is used for air discharge when a water level in the second pot liner rises and for air intake when the water level in the second pot liner drops; a bottom of the brewing chamber is connected with a water delivery pipe;
in use, the brewing substance is placed in the brewing chamber, and then the first pot liner is added with water and sealed, wherein a volume of the water added to the first pot liner is no more than 80% of a volume of the first pot liner, and a water level is lower than an air outlet of the air supply pipe; the controller and the water-air pump are started simultaneously, and the water-air pump feeds air to the first pot liner in the sealed state so as to direct the water to flow from the first pot liner into the second pot liner; the water enters the brewing chamber through the water delivery pipe and then enters the second pot liner; when the second water-level sensor of the second pot liner detects that water in the second pot liner rises to a designated water level, the second water-level sensor feeds back the first signal to the controller, and the controller controls the water-air pump to pump the water in the second pot liner back to the first pot liner; when the first water-level sensor of the first pot liner detects that the water in the first water-level sensor rises to a designated water level, the first water-level sensor feeds back the second signal to the controller, and the controller controls the water-air pump to feed air to the first pot liner to direct the water in the first pot liner to flow into the second pot liner and prevent water from being sucked into the water-air pump; through the first signal and the second signal fed by the first water-level sensor and the second water-level sensor back to the controller, the controller controls the water-air pump to repeat the above steps several times such that the brewing substance is fully soaked to release flavor components and the flavor components are uniformly diluted in the water to form the beverage.

In a third aspect, this application provides a beverage brewing pot, comprising:
the first pot liner;
the second kettle pot liner;
the water-air pump; and
the controller;
wherein the first pot liner and the second pot liner are arranged up and down; the first pot liner is connected to a bottom of the second pot liner; the water-air pump is fixedly provided on the top of the second pot liner; the brewing chamber is arranged between the first pot liner and the second pot liner; the first pot liner, the second pot liner and the brewing chamber are in communication; the first pot liner and the second pot liner both are in a sealed state during operation; the top of the first pot liner is provided with the first water-level sensor; the top of the second pot liner is provided with the second water-level sensor; a joint of an air inlet pipe of the water-air pump is communicated with the second pot liner; the joint of the air outlet pipe of the water-air pump is communicated with the first pot liner; the air and water in the first pot liner and the second pot liner all flow in an internal circulation manner; a bottom of the brewing chamber is connected with a water delivery pipe; in use, the brewing substance is placed in the brewing chamber, and then the first pot liner is added with water and sealed, wherein a volume of the water added to the first pot liner is less than 80% of a volume of the first pot liner; the controller and the water-air pump are simultaneously started, and the water-air pump feeds air to the first pot liner so as to direct the water to flow from first pot liner into the second pot liner; the water enters the brewing chamber through the water delivery pipe and then enters the second pot liner; when the second water-level sensor of the second pot liner detects that the water in the second pot liner rises to a designated water level, the second water-level sensor feeds back the first signal to the controller, and the controller controls the water-air pump to pump the water in the second pot liner back to the first pot liner; when the first water-level sensor of the first pot liner detects that water in the first pot liner rises to a designated water level, the first water-level sensor feeds back the second signal to the controller, and the controller controls the water-air pump to feed air to the first pot liner to direct the water in the first pot liner to flow into the second pot liner; through the first signal and the second signal fed by the first water-level sensor and the second water-level sensor back to the controller, the controller controls the water-air pump to repeat the above steps several times such that the brewing substance in the brewing chamber is fully soaked to release flavor components, and the flavor components are uniformly diluted in the water to form the beverage; and by means of the first water-level sensor and the second water-level sensor, water is prevented from being sucked into the water-air pump.

In a fourth aspect, this disclosure provides a beverage brewing pot, comprising:
the first pot liner;
the second pot liner;
the first water-air pump;
the second water-air pump;

the first pipe;
the second pipe; and
the controller;
wherein the top of the first pot liner and the top of the second pot liner are sealedly connected with a lid; the first water-air pump, the second water-air pump and the controller are fixedly provided on the lid; the first pot liner and the second pot liner are arranged inside and outside; the brewing chamber is arranged between the first pot liner and the second pot liner; the brewing chamber is fixedly provided on a bottom of the second pot liner; the first pot liner, the second pot liner and the brewing chamber are in communication; the first pot liner and the second pot liner both are in a sealed state during operation; the lid is provided with the first water-level sensor for detecting a water level of the first pot liner and the second water-level sensor for detecting a water level of the second pot liner; an air outlet of the first water-air pump is communicated with the first pot liner through the first pipe; an air inlet of the first water-air pump is communicated with the second pot liner through the first pipe; the first pipe is respectively connected with first air supply holes provided on an inner top of the lid to communicate the first pot liner with the second pot liner; an air outlet of the second water-air pump is communicated with the second pot liner through the second pipe; an air inlet of the second water-air pump is communicated with the first pot liner through the second pipe; the second pipe is respectively connected with second air supply holes provided on the inner top of the lid to communicate the first pot liner with the second pot liner; air and water in the first pot liner and the second pot liner all flow in an internal circulation manner; the second pot liner is arranged in the first pot liner and is sealedly connected to the lid; the first water-air pump and the second water-air pump do not operate at the same time, and when one is operating, the other stops; an internal valve of the one of the first water-air pump and the second water-air pump that is out of work is closed to ensure that the first water-air pump and the second water-air pump are not communicated; the controller is respectively connected to the first water-level sensor, the second water-level sensor, the first water-air pump and the second water-air pump through an electric wire to control the first water-level sensor, the second water-level sensor, the first water-air pump and the second water-air pump; the controller controls the first water-air pump to apply air pressure to the first pot liner such that a water level in the first pot liner drops and a water level in the second pot liner rises; when the second water-level sensor detects that the water in the second pot liner rises to a designated water level, the second water-level sensor feeds back the first signal to the controller, and the controller controls the first water-air pump to stop operating; then the controller controls the second water-air pump to apply air pressure to the second pot liner such that the water level in the first pot liner rises and the water level in the second pot liner drops; when the first water-level sensor detects that the water in the first pot liner rises to a designated water level, the first water-level sensor feeds back the second signal to the controller, and the controller controls the second water-air pump to stop operating, and controls the first water-air pump to operate again; through the first water-level sensor and the second water-level sensor, the above steps are automatically performed several times, such that the brewing substance is fully soaked in the brewing chamber to release flavor components and the flavor components are uniformly diluted in the water to form the beverage.

In an embodiment, the lid is provided with a first air hole communicating with the first pot liner; a wall of the first air hole is connected to a first three-way pipe; the lid is further provided with a second air hole communicating with the second pot liner; a wall of the second air hole is connected to a second three-way pipe; the air outlet of the first water-air pump is communicated with a first end of the first three-way pipe; the air inlet of the first water-air pump is communicated with a first end of the second three-way pipe; the air outlet of the second water-air pump is communicated with a second end of the second three-way pipe; the air inlet of the second water-air pump is communicated with a second end of the first three-way pipe; and the first three-way pipe and the second three-way pipe form a cross interconnection with the first water-air pump and the second water-air pump.

In an embodiment, the lid comprises a first fixing frame, a second fixing frame, a first sealing ring, a second sealing ring, a water-air pump fixing frame and a shell; the first fixing frame is threadedly connected with a spout of the first pot liner through the first sealing ring; the second fixing frame is sleeved on an inner wall of the first fixing frame in a sealed and fixed connection; a top of the second fixing frame is fixedly and sealedly connected with the water-air pump fixing frame; the second fixing frame is threadedly connected with a spout of the second pot liner through the second sealing ring; the spout of the first pot liner and the spout of the second pot liner are sealed and not communicated; the water-air pump fixing frame is provided with a first air hole communicating with the first pot liner and a second air hole communicating with the second pot liner; the first air hole and the second air hole are connected with the first pipe and the second pipe; and the shell is fixedly connected with the water-air pump fixing frame.

Compared to the prior art, this application has the following beneficial effects.

After the water and the brewing substance are added to the pot, the controller and the water-air pump are started simultaneously, and the water-air pump is controlled to feed air to the first pot liner in a sealed state to direct the water to flow from the first pot liner to the second pot liner. The water enters the brewing chamber through the water delivery pipe and then enters the second pot liner. When the second water-level sensor detects that the water rises to a designated water level, the second water-level sensor feeds back a first signal to the controller, and the controller controls the water-air pump to reversely operate to pump the water in the second pot liner back to the first pot liner. When the first water-level sensor detects that the water has risen to a designated water level, the first water-level sensor feeds back the second signal to the controller, and the controller controls the water-air pump to feed air to direct the water in the first pot liner to flow into the second pot liner. Meanwhile, the water is prevented from being sucked into the water-air pump. Through the first signal and the second signal fed by the first water-level sensor and the second water-level sensor back to the controller, the controller controls the water-air pump to repeat the above steps several times such that the brewing substance is fully soaked to release flavor components and the flavor components are uniformly diluted in the water to form the beverage.

DETAILED DESCRIPTION OF EMBODIMENTS

Figure 1:
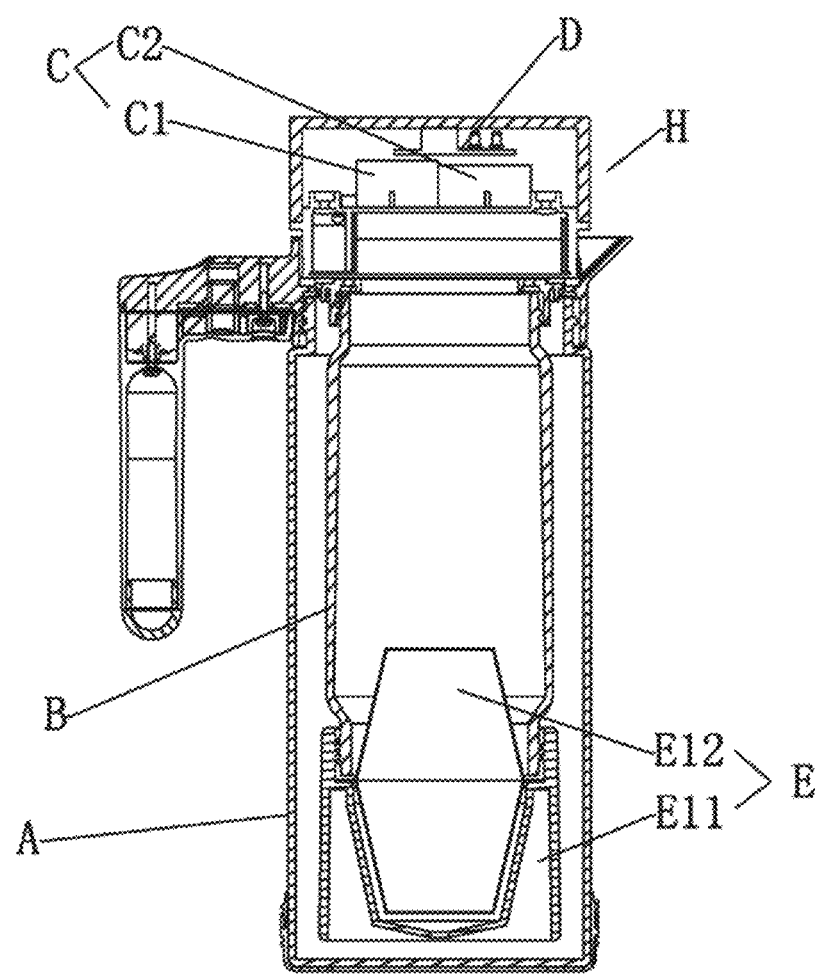
FIG. 1 is a sectional view of a beverage brewing pot according to Embodiment 8 of the disclosure.
Figure 2:
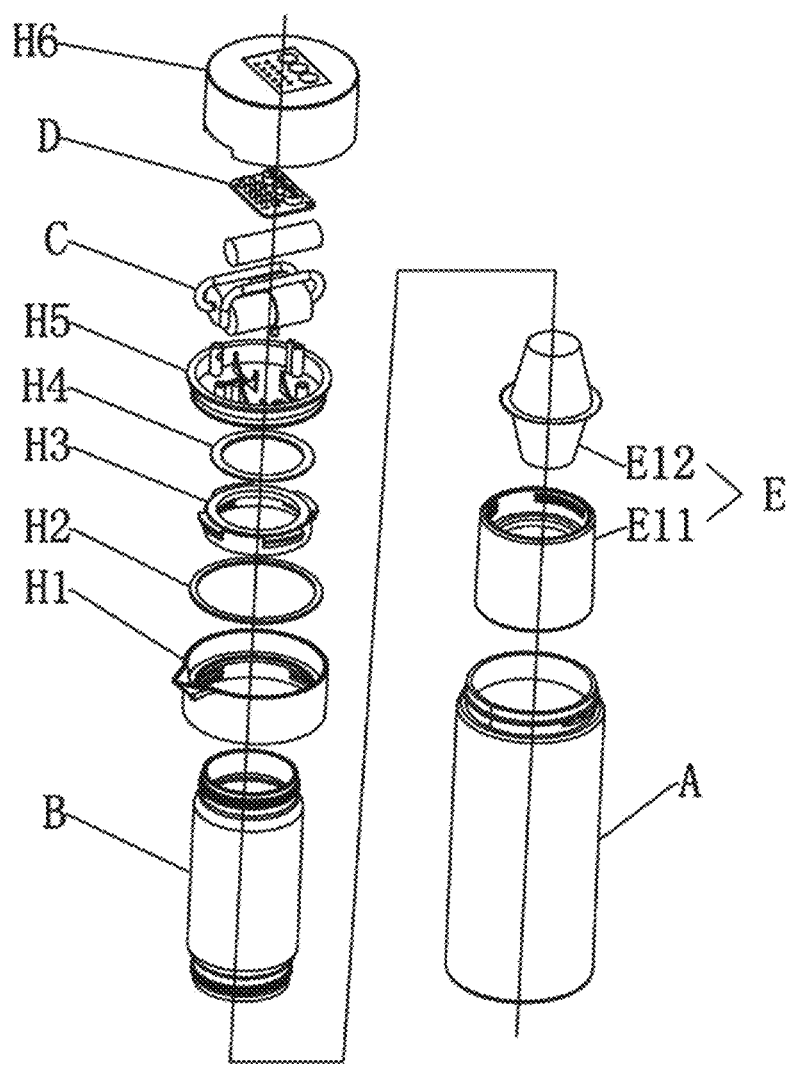
FIG. 2 is an exploded view of the beverage brewing pot according to Embodiment 8 of the disclosure.
Figure 3:
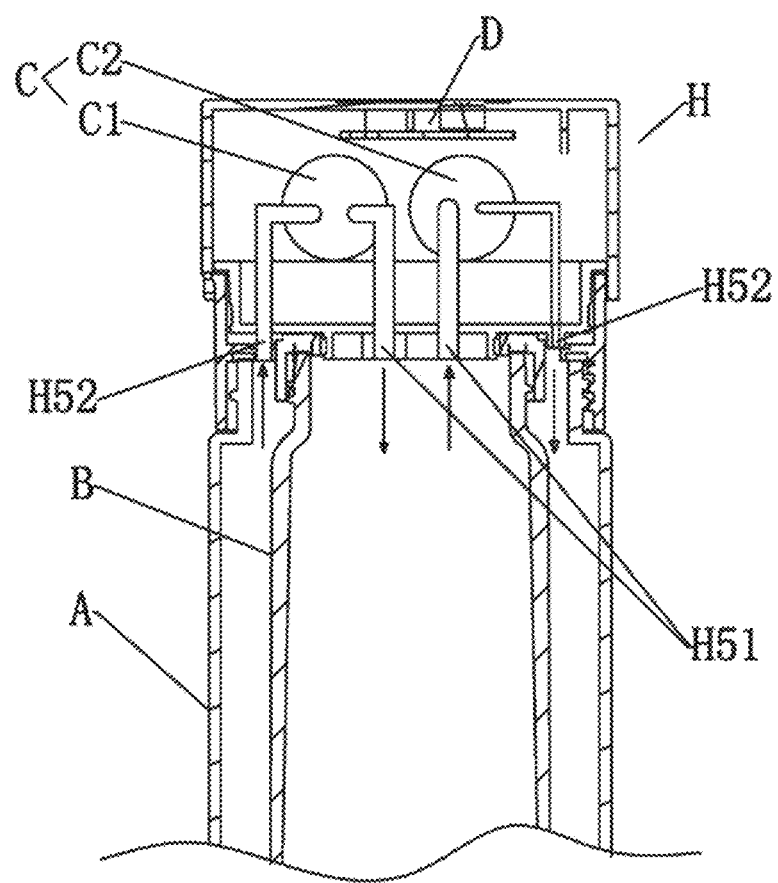
FIG. 3 and FIG. 4 are other sectional views of the beverage brewing pot according to Embodiment 8 of the disclosure.
Figure 4:
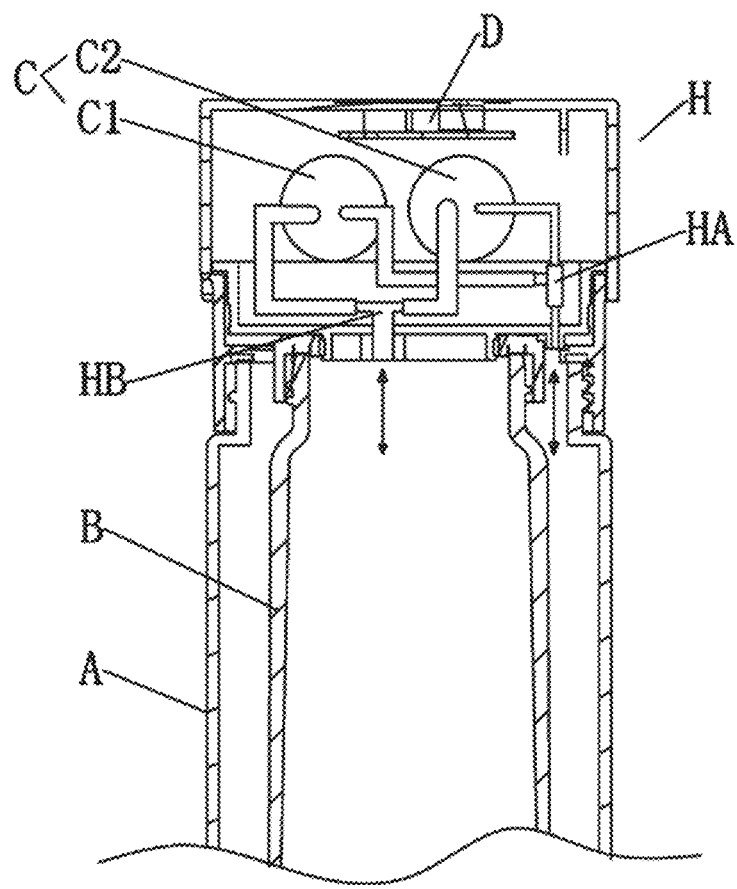
Figure 5:
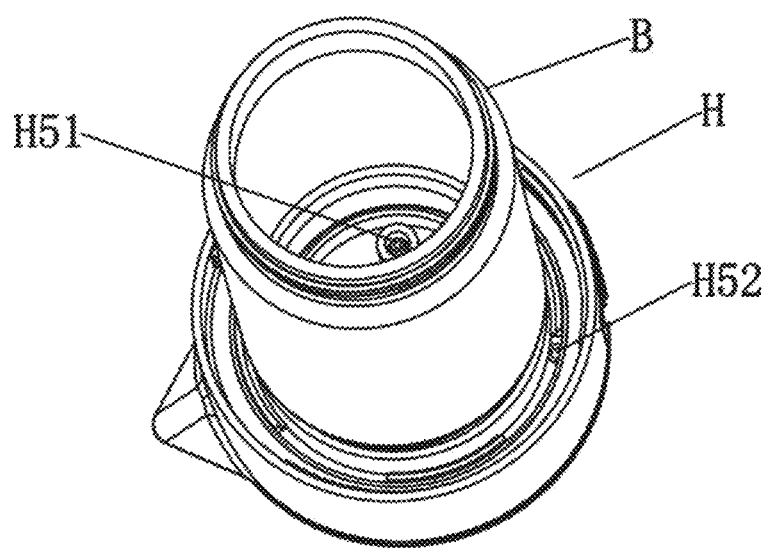
FIG. 5 schematically shows connection between a second pot liner and a lid according to Embodiment 8 of the disclosure.
Figure 6:
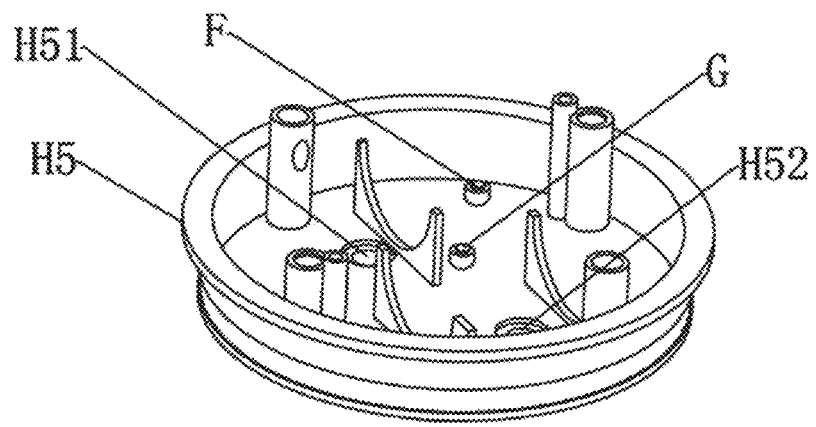
FIG. 6 is a perspective view of a water-air pump fixing frame according to an embodiment of the disclosure.
Figure 7:
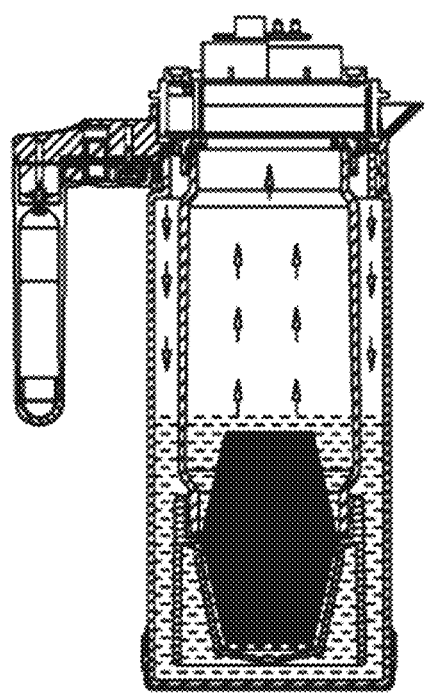
FIG. 7 and FIG. 8 are schematic diagrams of a process in the beverage brewing pot according to Embodiment 8 of the disclosure in which the water level of the first pot liner drops and the water level of the second pot liner rises.
Figure 8:
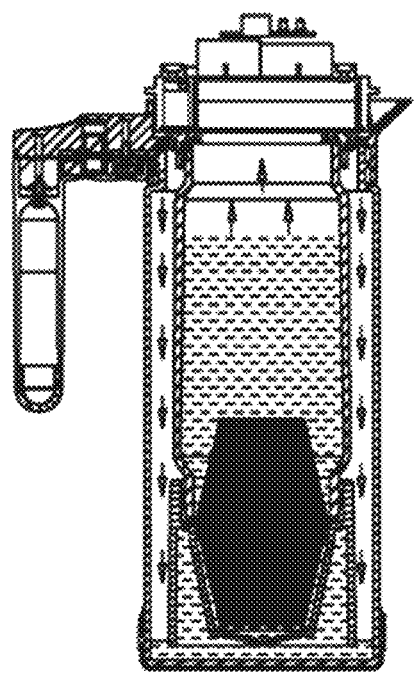
Figure 9:
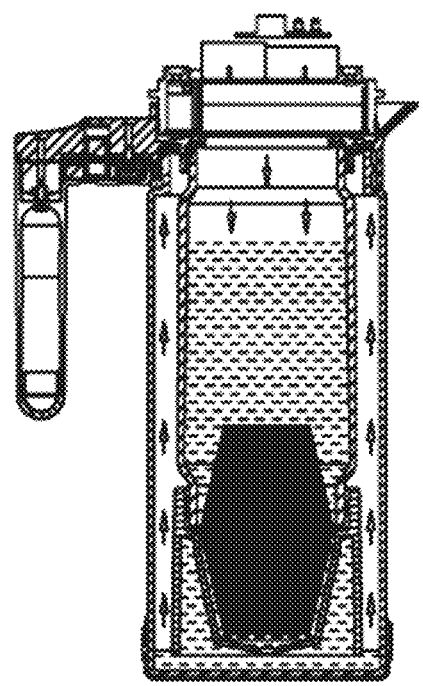
FIG. 9, FIG. 10 and FIG. 11 are schematic diagrams of a process in the beverage brewing pot according to Embodiment 8 of the disclosure in which the water level of the first pot liner rises and the water level of the second pot liner drops.
Figure 10:
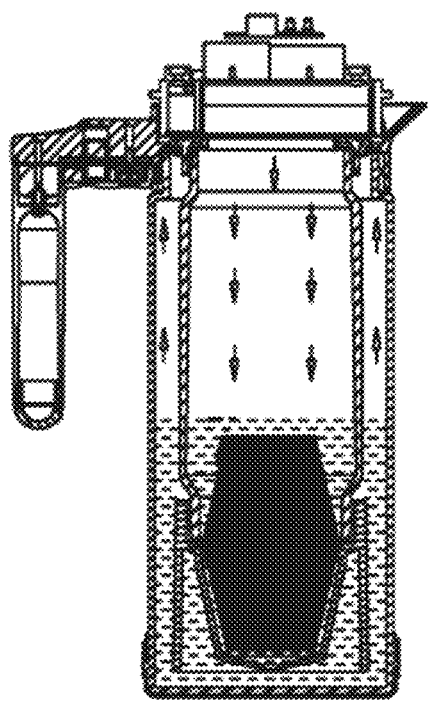
Figure 11:
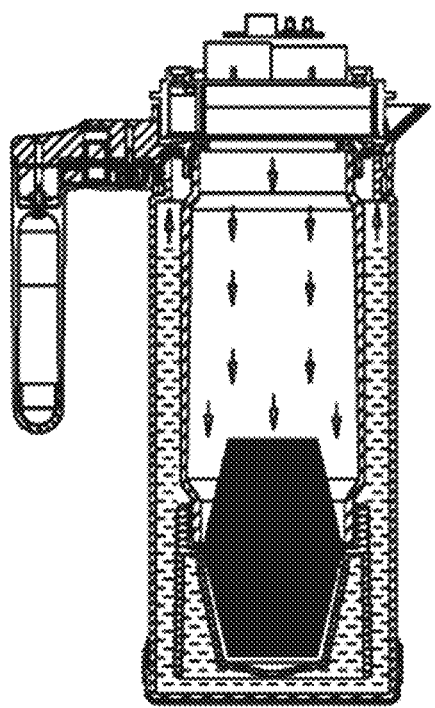
Figure 12:
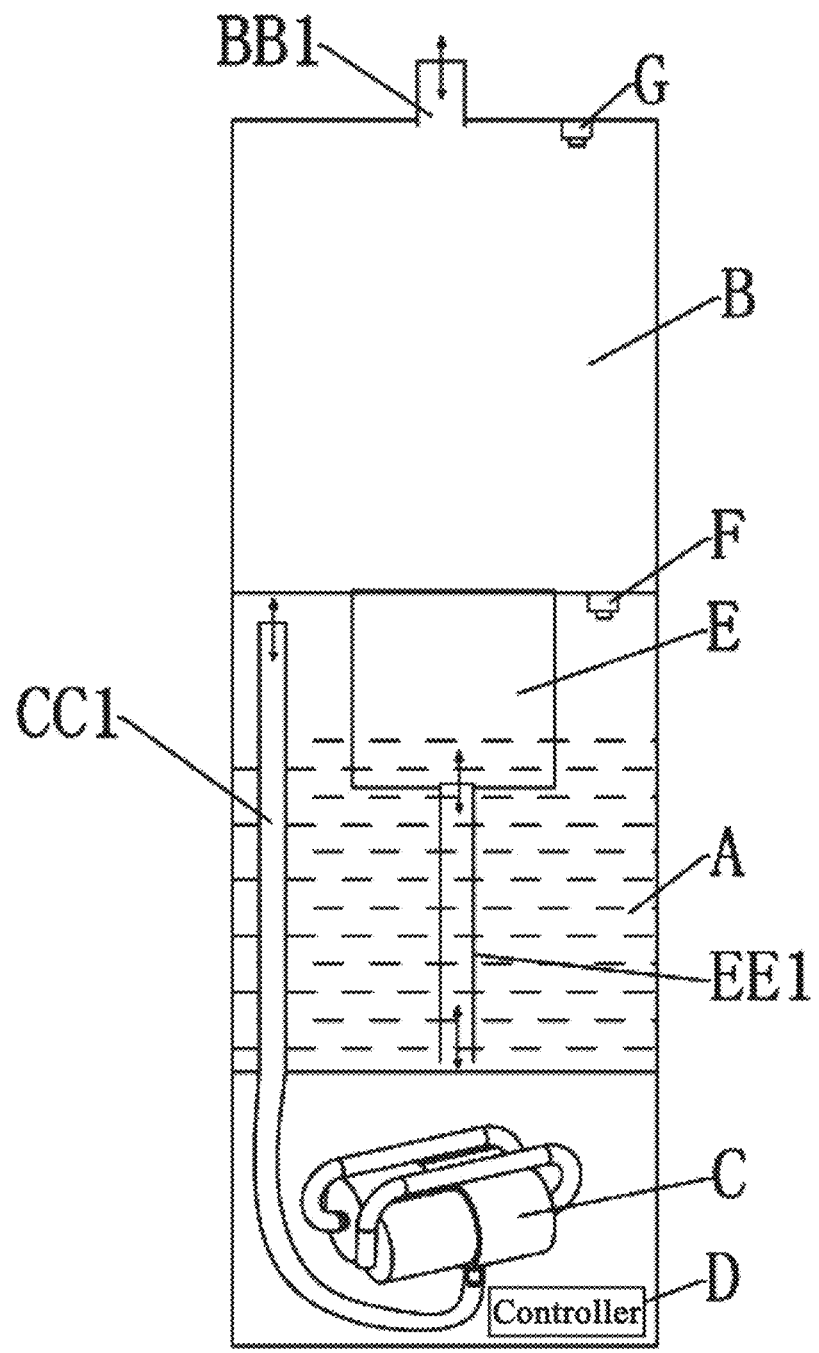
FIG. 12 and FIG. 13 are schematic diagrams of a process in the beverage brewing pot according to Embodiment 4 of the disclosure in which the water flows to the second pot liner after the first pot liner is fed with air.
Figure 13:
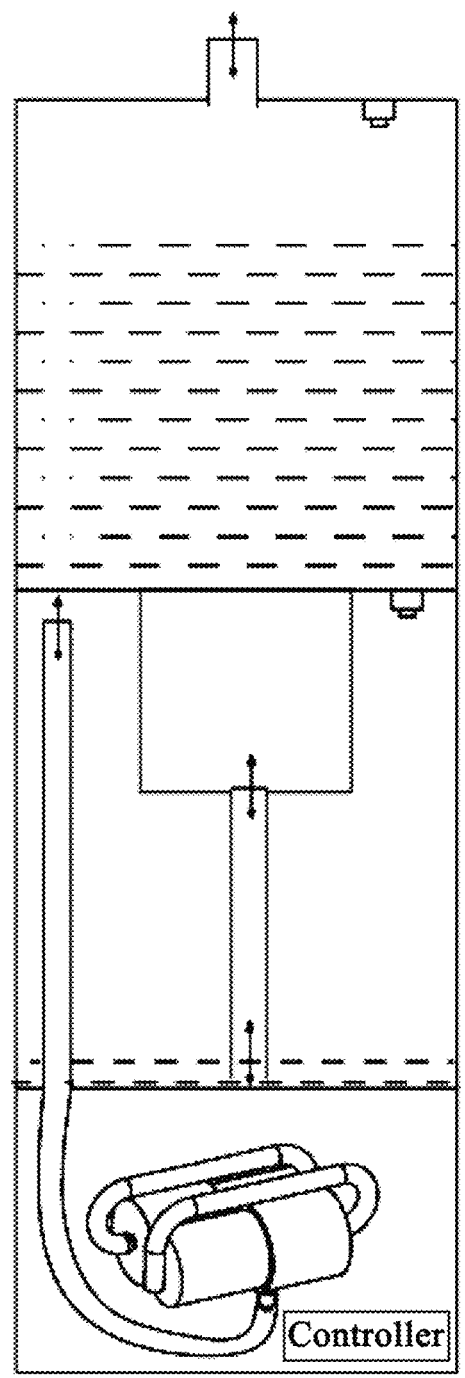
Figure 14:
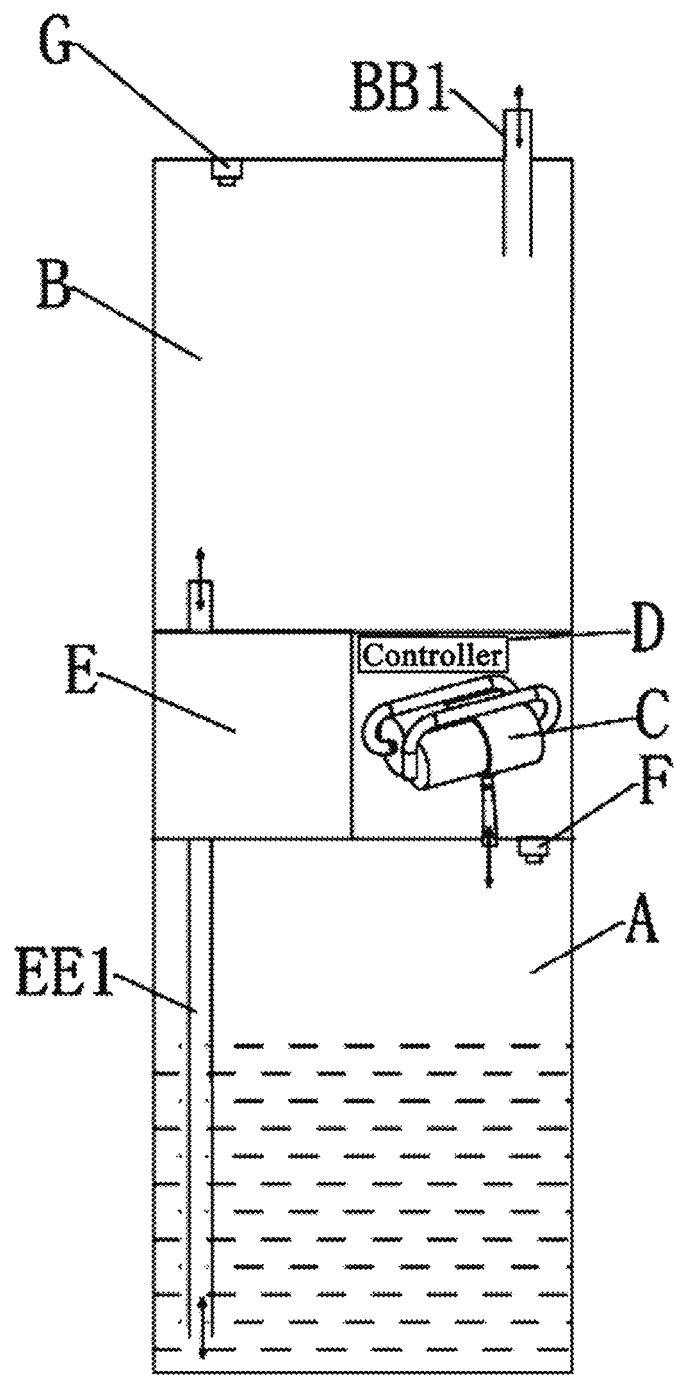
FIG. 14 and FIG. 15 are schematic diagrams of a process in the beverage brewing pot according to Embodiment 5 of the disclosure in which the water flows to the second pot liner after the first pot liner is fed with air.
Figure 15:
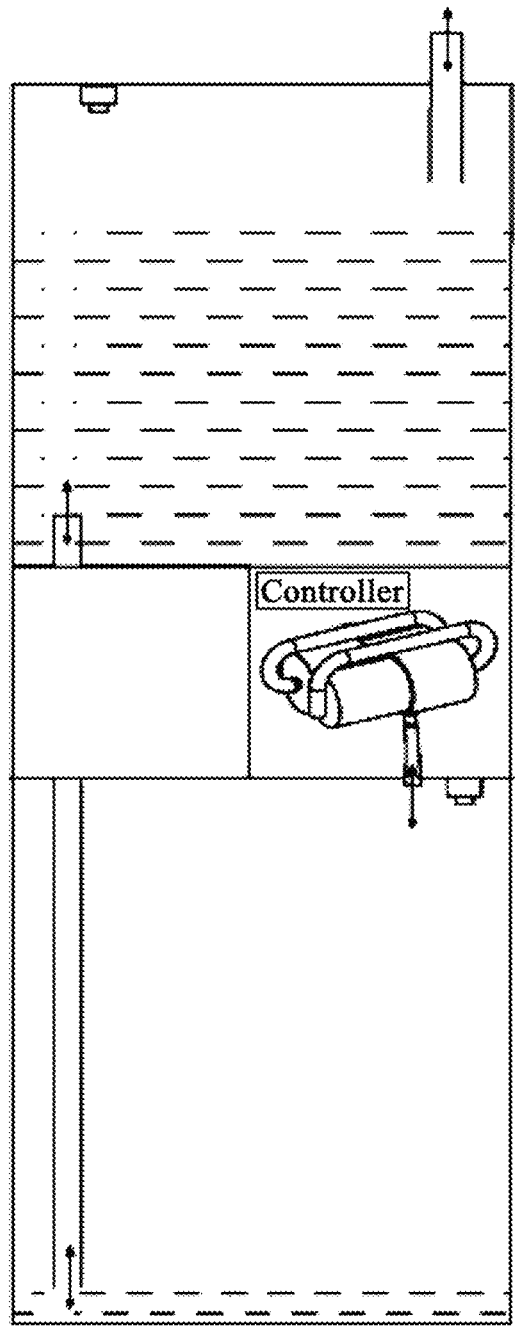
Figure 16:
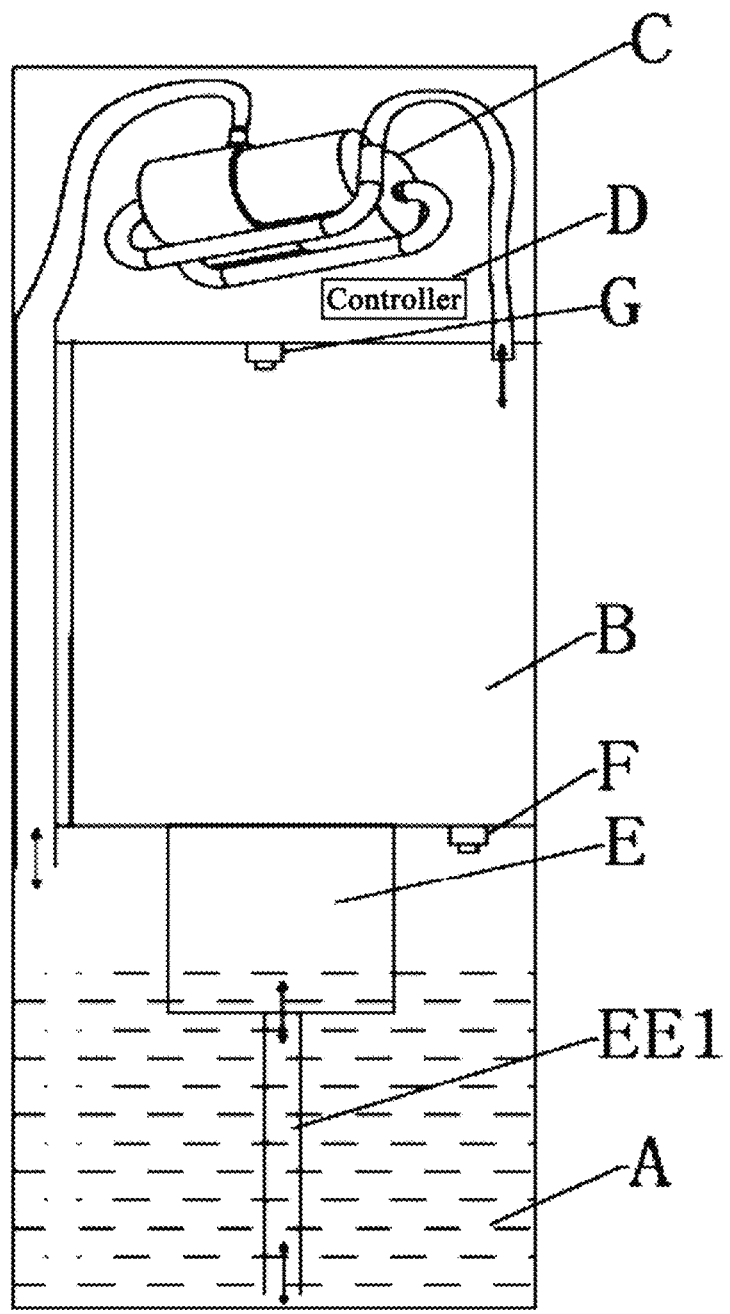
FIG. 16 and FIG. 17 are schematic diagrams of a process in the beverage brewing pot according to Embodiment 7 of the disclosure in which the water flows to the second pot liner after the first pot liner is fed with air.
Figure 17:
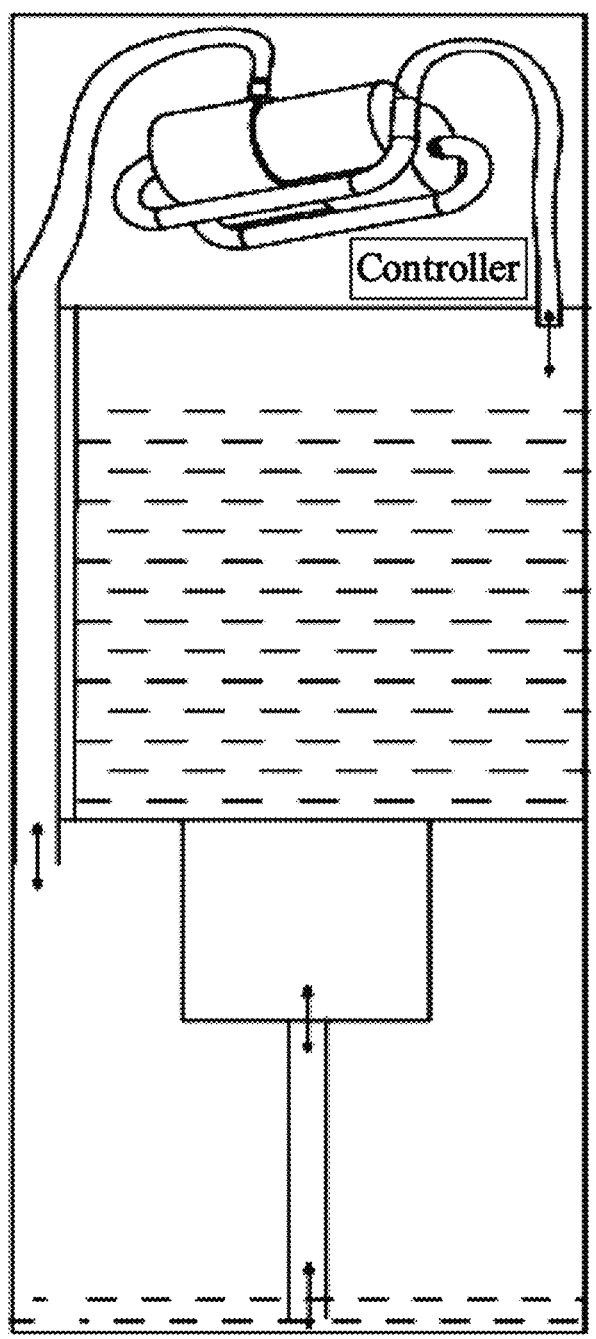
Figure 18:
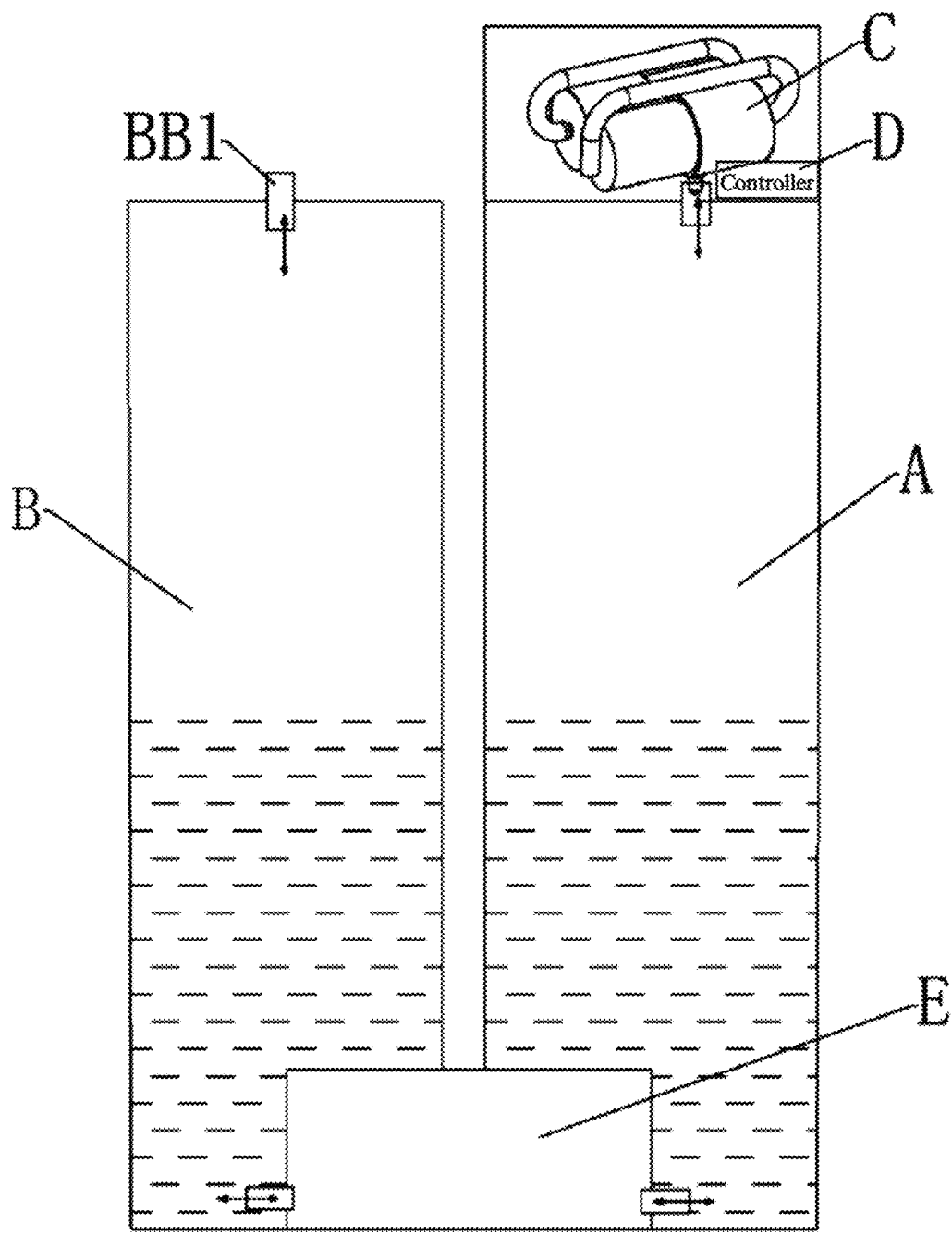
FIG. 18 is a schematic diagram of a process in the beverage brewing pot according to Embodiment 6 of the disclosure in which the water flows to the second pot liner after the first pot liner is fed with air.

As shown in FIGS. 1-18, this disclosure provides a beverage brewing method using a beverage brewing pot, where the beverage brewing pot includes a first pot liner A, a second pot liner B, at least one water-air pump C and a controller D. A brewing chamber E is arranged between the first pot liner A and the second pot liner B, and the first pot liner A, the second pot liner B and the brewing chamber E are in communication. At least the first pot liner A is in a sealed state during operation (namely, during the operation, the first pot liner A is sealed, and the second pot liner B can be in a sealed state or not). A first water-level sensor F is provided at a top of the first pot liner A, and a second water-level sensor G is provided at a top of the second pot liner B. A joint of an air outlet pipe of the water-air pump C is in communication with the first pot liner A during operation to feed air to the first pot liner A. The brewing method is specifically described as follows.

(1) The brewing substance is placed in the brewing chamber.

(2) Water is added to the first pot liner A or the second pot liner B, and then the first pot liner A is sealed, where a volume of the water is not more than 95% of a volume of the first pot liner A or the second pot liner B.

(3) The controller D and the water-air pump C are simultaneously started, and the water-air pump feeds air to the first pot liner A in the sealed state so as to direct the water to flow from the first pot liner A in the sealed state into the second pot liner.

(4) When the second water-level sensor G of the second pot liner detects that the water of the second pot liner B has risen to a designated water level, the second water-level sensor G feeds back a first signal to the controller D, and then the controller D controls the water-air pump C to operate to pump the water in the second pot liner B back to the first pot liner A, or controls the water-air pump C to allow air in the first pot liner A to escape such that the water in the second pot liner B returns to the first pot liner A under an action of gravity.

(5) When the first water-level sensor F of the first pot liner A detects that the water of the first pot liner A has risen to a designated water level, the first water-level sensor F feeds back a second signal to the controller D, and the controller D controls the water-air pump C to feed air to the first pot liner A to direct the water in the first pot liner A to flow into the second pot liner.

(6) Based on feedback of the first and second signals or the setting of a designated time, the steps (4) and (5) are repeated several times, so that the brewing substance in the brewing chamber E is fully soaked to release the flavor components, and the flavor components are uniformly diluted in the water along with the water flow to form the beverage.

In an embodiment, the first pot liner A and the second pot liner B both are sealed in the operating state; a joint of an inlet pipe of the water-air pump C is communicated with the second pot liner B; the joint of the outlet pipe of the water-air pump C is communicated with the first pot liner A; air and water in the first pot liner A and the second pot liner B all flow in an internal circulation manner; and in step (4), after the second water-level sensor G feeds back the first signal to the controller D, the controller D controls the water-air pump C to pump the water in the second pot liner B back to the first pot liner A.

In an embodiment, the water-air pump consists of a first water-air pump C1 and a second water-air pump C2; the beverage brewing pot further comprises a first pipe and a second pipe; an air outlet of the first water-air pump C1 is communicated with the first pot liner A through the first pipe; an air inlet of the first water-air pump C1 is communicated with the second pot liner B through the first pipe; an air outlet of the second water-air pump C2 is communicated with the second pot liner B through the second pipe; an air inlet of the second water-air pump C2 is communicated with the first pot liner A through the second pipe; the step (3) is performed through steps of:

starting the controller D and the first water-air pump C1 simultaneously to allow the first water-air pump C1 to feed air to the first pot liner A in the sealed state so as to direct water in the first pot liner A to flow into the second pot liner B;

the step (4) is performed through steps of:

when the second water-level sensor G of the second pot liner B detects that the water in the second pot liner B rises to a designated water level, feeding back, by the second water-level sensor G, the first signal to the controller D; controlling, by the controller D, the first water-air pump C1 to stop operating, and controlling, by the controller D, the second water-air pump C2 to feed air to the second pot liner B to direct the water in the second pot liner B to flow back to the first pot liner A; and the step (5) is performed through steps of:

when the first water-level sensor F of the first pot liner A detects that the water in the first pot liner A rises to a designated water level, feeding back, by the first water-level sensor F, the second signal to the controller D; controlling, by the controller D, the second water-air pump C2 to stop operating, and controlling, by the controller D, the first water-air pump C1 to feed air to the first pot liner A to direct the water in the first pot liner A to flow into the second pot liner B.

In an embodiment, the first pot liner A and the second pot liner B are arranged up and down, or left and right, or inside and outside.

In an embodiment, the first pot liner A and the second pot liner B are arranged up and down; in the operating state, the first pot liner A is in a sealed state and the second pot liner B is not sealed; and the controller D is configured to control the water-air pump C to allow air in the first pot liner A to escape so that the water in the second pot liner B returns to the first pot liner A under action of gravity.

Embodiment 1

Provided herein is a beverage brewing method using a beverage brewing pot, where the beverage brewing pot includes a first pot liner A, a second pot liner B, a water-air pump C and a controller D. The first pot liner A and the second pot liner B are arranged up and down. A bottom of the second pot liner B is connected to the first pot liner A. The water-air pump C is fixedly provided on a bottom of the first pot liner A, or fixedly provided at a middle part between the first pot liner A and the second pot liner B, or fixedly provided on a top of the second pot liner B. A brewing chamber E is arranged between the first pot liner A and the second pot liner B. The first pot liner A, the second pot liner B and the brewing chamber E are in communication. In an operating state, the first pot liner A is sealed while the second pot liner B is not sealed. A first water-level sensor F is provided at the top of the first pot liner A. A second water-level sensor G is provided at the top of the second pot liner B. The joint of the air outlet pipe of the water-air pump C is in communication with the first pot liner A during operation to feed air to the first pot liner A. The brewing method is specifically described as follows.

(1) The brewing substance is placed in the brewing chamber E.

(2) Water is added to the first pot liner A, and then the first pot liner A is sealed, where a volume of the water is 70% of a volume of the first pot liner A.

(3) The controller D and the water-air pump C are simultaneously started, and the water-air pump C feeds air to the first pot liner in the sealed state so as to direct the water to flow from the first pot liner A in the sealed state into the second pot liner B.

(4) When the second water-level sensor G of the second pot liner B detects that the water of the second pot liner B has risen to a designated water level, the second water-level sensor G feeds back a first signal to the controller D, and the controller D controls the water-air pump C to operate to pump the water in the second pot liner B back to the first pot liner A.

(5) When the first water-level sensor F of the first pot liner A detects that the water of the first pot liner A has risen to a designated water level, the first water-level sensor F feeds back a second signal to the controller D, and the controller D controls the water-air pump C to feed air to the first pot liner A to direct the water in the first pot liner A to flow into the second pot liner.

(6) Based on feedback of the first and second signals or the setting of a designated time, the controller D controls the water-air pump C to repeat the steps (4) and (5) several times, so that the brewing substance in the brewing chamber E is soaked to release the flavor components, and the flavor components are uniformly diluted in the water along with the water flow to form the beverage.

Embodiment 2

Provided herein is a beverage brewing method using a beverage brewing pot, where the beverage brewing pot includes a first pot liner A, a second pot liner B, a water-air pump C and a controller D. The first pot liner A and the second pot liner B are arranged up and down, and the bottom of the second pot liner B is connected to the first pot liner A. The water-air pump C is fixedly provided on the upper part of the first pot liner A or the middle part between the first pot liner A and the second pot liner B or the bottom of the second pot liner B). A brewing chamber E is arranged between the first pot liner A and the second pot liner B. The first pot liner A, the second pot liner B and the brewing chamber E are in communication. The first pot liner A and the second pot liner B both are in a sealed state. A first water-level sensor F is provided at the top of the first pot liner A. A second water-level sensor G is provided at the top of the second pot liner B. The joint of the air inlet pipe of the water-air pump C is communicated with the second pot liner B. The joint of the air outlet pipe is communicated with the first pot liner A. The air and water in the first pot liner A and the second pot liner B all flow in an internal circulation manner. The brewing method is specifically described as follows.

(1) The brewing substance is placed in the brewing chamber.

(2) Water is added to the first pot liner A, and then the first pot liner A is sealed, where a volume of the water is 80% of a volume of the first pot liner A.

(3) The controller D and the water-air pump C are simultaneously started, and the water-air pump C feeds air to the first pot liner in the sealed state so as to direct the water to flow from the first pot liner A in the sealed state into the second pot liner.

(4) When the second water-level sensor G of the second pot liner B detects that the water of the second pot liner B has risen to a designated water level, the second water-level sensor G feeds back a first signal to the controller D, and the controller D controls the water-air pump C to operate to pump the water in the second pot liner B back to the first pot liner A.

(5) When the first water-level sensor F of the first pot liner A detects that the water of the first pot liner A has risen to a designated water level, the first water-level sensor F feeds back a second signal to the controller D, and the controller D controls the water-air pump to feed air to the first pot liner A to direct the water in the first pot liner A to flow into the second pot liner B.

(6) Based on feedback of the first and second signals or the setting of a designated time, the controller D controls the water-air pump C to repeat the steps (4) and (5) several times, so that the brewing substance in the brewing chamber E is fully soaked to release the flavor components, and the flavor components are uniformly diluted in the water along with the water flow to form the beverage.

Embodiment 3

Provided herein is a beverage brewing method using a beverage brewing pot, where the beverage brewing pot includes a first pot liner A, a second pot liner B, a first water-air pump C1, a second water-air pump C2, a first pipe, a second pipe and a controller D. The first pot liner A and the second pot liner B are arranged inside and outside. A brewing chamber E is arranged between the first pot liner A and the second pot liner B. The first pot liner A, the second pot liner and the brewing chamber E are in communication. The first pot liner A and the second pot liner B both are in a sealed state during operation. A first water-level sensor F is provided at the top of the first pot liner A. A second water-level sensor G is provided at the top of the second pot liner B. The air outlet of the first water-air pump C1 is communicated with the first pot liner A through the first pipe, and the air inlet of the first water-air pump C1 is communicated with the second pot liner B through the first pipe. The air outlet of the second water-air pump C2 is communicated with the second pot liner B through the second pipe, and the air inlet of the second water-air pump C2 is communicated with the first pot liner A through the second pipe. The air and water in the first pot liner A and the second pot liner B all flow in an internal circulation manner. The brewing method is specifically described as follows.

(1) The brewing substance is placed in the brewing chamber.

(2) Water is added to the first pot liner A, and the first pot liner A is sealed, where a volume of the water is 80% of a volume of the first pot liner A.

(3) The controller D and the first water-air pump C1 are started simultaneously, and the first water-air pump C1 feeds air to the first pot liner A in the sealed state so as to direct the water to flow from the first pot liner A into the second pot liner B.

(4) When the second water-level sensor of the second pot liner B detects that the water of the second pot liner B has risen to a designated water level, the second water-level sensor G feeds back a first signal to the controller D, and the controller D controls the first water-air pump C1 to stop operating, and controls the second water-air pump C2 to feed air to the second pot liner B to direct the water to flow back to the first pot liner A.

(5) When the first water-level sensor F of the first pot liner A detects that the water has risen to a designated water level, the first water-level sensor F feeds back a second signal to the controller D, and the controller D controls the second water-air pump C2 to stop operating, and controls the first water-air pump C1 to feed air to the first pot liner A to direct the water in the first pot liner A to flow into the second pot liner B.

(6) Based on feedback of the first and second signals or the setting of a designated time, the controller D controls the water-air pump C to repeat the steps (4) and (5) several times, so that the brewing substance in the brewing chamber E is fully soaked to release the flavor components, and the flavor components are uniformly diluted in the water along with the water flow to form the beverage.

Embodiment 4

Provided herein is a beverage brewing pot, which includes kettle first pot liner A, a second pot liner B, a water-air pump C and a controller D. The first pot liner A and the second pot liner B are arranged up and down, and the bottom of the second pot liner B is connected to the first pot liner A. The water-air pump C is fixedly provided on the bottom of the first pot liner A. A brewing chamber E is arranged between the first pot liner A and the second pot liner B. The first pot liner A, the second pot liner B and the brewing chamber E are in communication. During the operation, the first pot liner A is in a sealed state while the second pot liner B is not. A first water-level sensor F is provided at the top of the first pot liner A. A second water-level sensor G is provided at the top of the second pot liner B. The joint of the air outlet pipe of the water-air pump C is connected with an air supply pipe CC1. The air supply pipe CC1 extends to be close to the inner top of the first pot liner A, and is connected to the first pot liner A in a sealed state during operation for air supply. The top of the second pot liner B is provided with an air port BB1 and is not sealed, which is used for air discharge when the water level of the second pot liner B rises and for air intake when the water level in the second pot liner B drops. The bottom of the brewing chamber E is connected with a water delivery pipe EE1. The water delivery pipe EE1 extends to be close to the bottom of the first pot liner A. In use, the brewing substance is placed in the brewing chamber E, and then the first pot liner A is added with water and sealed, where a volume of the water is 80% of a volume of the first pot liner A, and the water level is lower than the air outlet of the air supply pipe CC1. The controller D and the water-air pump C are started simultaneously, and the water-air pump C feeds air to the first pot liner A in the sealed state so as to direct the water to flow from the first pot liner A to flow into the second pot liner B. The water enters the brewing chamber E through the water delivery pipe EE1 and then enters the second pot liner B. When the second water-level sensor G of the second pot liner B detects that the water has risen to a designated water level, the second water-level sensor B feeds back a first signal to the controller D, and the controller D controls the water-air pump C to operate to pump the water in the second pot liner B back to the first pot liner A. When the first water-level sensor F of the first pot liner A detects that the water of the first pot liner A has risen to a designated water level, the first water-level sensor F feeds back a second signal to the controller D, and the controller D controls the water-air pump C to feed air to the first pot liner A to direct the water in the first pot liner A to flow into the second pot liner B. Meanwhile, the water is prevented from being sucked into the water-air pump C. Through the first signal and the second signal fed by the first water-level sensor F and the second water-level sensor G back to the controller D, the controller D controls the water-air pump C to repeat the above steps several times such that the brewing substance is fully soaked to release flavor components and the flavor components are uniformly diluted in the water to form the beverage.

Embodiment 5

The beverage brewing pot provided herein is basically the same as that in Embodiment 4 except that in this embodiment, the water water-air pump C is fixedly provided at the middle part between the first pot liner A and the second pot liner B; the air supply joint and the air supply outlet of the water-air pump C are fixedly provided on the inner top of the first pot liner A; and the air supply pipe CC1 is not required. The brewing pot provided herein shares the same working process with the brewing pot in Embodiment 4.

Embodiment 6

The beverage brewing pot provided herein is basically the same as that in Embodiment 4 except that in this embodiment, the first pot liner A and the second pot liner B are arranged left and right; the water-air pump C is fixedly provided at the top of the first pot liner A; the air supply joint and the air supply outlet of the water-air pump C are fixedly provided on the inner top of the first pot liner A; and the air supply pipe CC1 and the water delivery pipe (EE1) are not required. The brewing pot provided herein shares the same working process with the brewing pot in Embodiment 4.

Embodiment 7

Provided herein is a beverage brewing pot, which includes a first pot liner A, a second pot liner B, a water-air pump C and a controller D. The first pot liner A and the second pot liner B are arranged up and down. The bottom of the second pot liner B is connected to the first pot liner A. The water-air pump C is fixedly provided on the top of the second pot liner B. A brewing chamber E is arranged between the first pot liner A and the second pot liner B. The first pot liner A, the second pot liner B and the brewing chamber E are in communication. The first pot liner A and the second pot liner B both are in a sealed state during operation. A first water-level sensor F is provided at the top of the first pot liner A. A second water-level sensor G is provided at the top of the second pot liner B. The joint of the air inlet pipe of the water-air pump C is communicated with the second pot liner B. The joint of the air outlet pipe of the water-air pump C is communicated with the first pot liner A. The air and water in the first pot liner A and the second pot liner B all flow in an internal circulation manner. The bottom of the brewing chamber E is connected with a water delivery pipe EE1 In use, the brewing substance is placed in the brewing chamber E, and then the first pot liner A is added with water and sealed, where a volume of the water is 85% of a volume of the first pot liner A. The controller D and the water-air pump C are started simultaneously, and the water-air pump C feeds air to the first pot liner A in the sealed state so as to direct the water to flow from the first pot liner A to flow into the second pot liner B. The water enters the brewing chamber E through the water delivery pipe EE1 and then enters the second pot liner B. When the second water-level sensor G of the second pot liner B detects that the water has risen to a designated water level, the second water-level sensor B feeds back a first signal to the controller D, and the controller D controls the water-air pump C to operate to pump the water in the second pot liner B back to the first pot liner A. When the first water-level sensor F of the first pot liner A detects that the water of the first pot liner A has risen to a designated water level, the first water-level sensor F feeds back a second signal to the controller D, and the controller D controls the water-air pump C to feed air to the first pot liner A to direct the water in the first pot liner A to flow into the second pot liner B. Through the first signal and the second signal fed by the first water-level sensor F and the second water-level sensor G back to the controller D, the controller D controls the water-air pump C to repeat the above steps several times such that the brewing substance is fully soaked to release flavor components and the flavor components are uniformly diluted in the water to form the beverage.

The first water-level sensor F and the second water-level sensor G can prevent the water from being sucked into the water-air pump C.

Embodiment 8

Provided herein is a beverage brewing pot, which includes a first pot liner A, a second pot liner B, a first water-air pump C1, a second water-air pump C2, a first pipe, a second pipe, and a controller D. The tops of the first pot liner A and the second pot liner B are sealedly connected with a lid H. The first water-air pump C1, the second water-air pump C2 and the controller D are fixedly provided on the lid H. The control button of the controller D is fixed on the top of the lid H. The first pot liner A and the second pot liner B are arranged inside and outside. A brewing chamber E is arranged between the first pot liner A and the second pot liner B. The brewing chamber E is fixedly provided on the bottom of the second pot liner B. The first pot liner A, the second pot liner B and the brewing chamber E are in communication. The first pot liner A and the second pot liner B both are in a sealed state during operation. The lid H is provided with the first water-level sensor F for detecting a water level of the first pot liner A and the second water-level sensor G for detecting a water level of the second pot liner B. The air outlet of the first water-air pump C1 is communicated with the first pot liner A through the first pipe, the air inlet is communicated with the second pot liner B through the first pipe. The first pipe is respectively connected with corresponding air supply holes provided on the inner top of the lid H to communicate the first pot liner A with the second pot liner B. The air outlet of the second water-air pump C2 is communicated with the second pot liner B through the second pipe, and the air inlet is communicated with the first pot liner A through the second pipe. The second pipe is respectively connected with corresponding air supply holes provided on the inner top of the lid H to communicate the first pot liner A with the second pot liner B. The air and water in the first pot liner A and the second pot liner B all flow in an internal circulation manner. The second pot liner B is arranged in the first pot liner A and is sealedly connected to the lid H. The first water-air pump C1 and the second water-air pump C2 cannot operate at the same time, and when one is operating, the other stops. The internal valve of the water-air pump which is out of work is closed to ensure that the first water-air pump C1 and the second water-air pump C2 are not communicated. The controller D is connected to the first water-level sensor F, the second water-level sensor G, the first water-air pump C1 and the second water-air pump C2 through electric wire to control their operations. The controller D controls the first water-air pump C1 to apply air pressure to the first pot liner A such that the water level of the first pot liner A drops and the water level of the second pot liner B rises. When the second water-level sensor G detects that the water has risen to a designated water level, it feeds back a first signal to the controller D, and the controller D controls the first water-air pump C1 to stop operating. Then the controller D controls the second water-air pump C2 to operate to apply air pressure to the second pot liner B such that the water level of the second pot liner B drops and the water level of the first pot liner A rises. When the first water-level sensor F detects that the water has risen to a designated water level, it feeds back a second signal to the controller D, and the controller D controls the second water-air pump C2 to stop operating, and controls the first water-air pump C1 to operate again. Through the first signal and the second signal fed by the first water-level sensor F and the second water-level sensor G back to the controller D, the controller D controls the first water-air pump C1 and the second water-air pump C2 to repeat the above steps several times such that the brewing substance is fully soaked to release flavor components and the flavor components are uniformly diluted in the water to form the beverage.

In an embodiment, the lid H is provided with a first air hole communicating with the first pot liner A. A first three-way pipe HA is connected to a wall of the first air hole. The lid H is further provided with a second air hole communicating with the second pot liner B, and a wall of the second air hole is connected to a second three-way pipe HB. The air outlet of the first water-air pump C1 is communicated with a first end of the first three-way pipe HA. The air inlet of the first water-air pump C1 is communicated with a first end of the second three-way pipe HB. The air outlet of the second water-air pump C2 is communicated with a second end of the second three-way pipe HB, and the air inlet of the second water-air pump C2 is communicated with a second end of the first three-way pipe HA. The first three-way pipe HA and the second three-way pipe HB form a cross interconnection with the first water-air pump C1 and the second water-air pump C2.

In another embodiment, the above-mentioned three-way pipe can be replaced by the following technical solutions. The bottom of the lid H is provided with two first air supply holes H51 and two second air supply holes H52. The air outlet of the first water-air pump C1 is connected with one of the first air supply holes H51 to communicate with the second pot liner B, and the air inlet of the first water-air pump C1 is connected with one of the second air supply holes H52 to communicate with the first pot liner A. The air inlet of the second water-air pump C2 is connected to the other of the first air supply holes H51 to communicate with the inner pot liner, and the air outlet of the second water-air pump C2 is connected to the other of the second air supply holes H52 to communicate with the outer pot liner.

In an embodiment, the lid H includes a first fixing frame H1, a second fixing frame H3, a first sealing ring H2, a second sealing ring H4, a water-air pump fixing frame H5 and a shell H6. The first fixing frame H1 is threadedly connected with a spout of the first pot liner A through the first sealing ring H2. The second fixing frame H3 is sleeved on an inner wall of the first fixing frame H1 in a sealed and fixed connection. A top of the second fixing frame H3 is fixedly and sealedly connected with the water-air pump fixing frame H5. The second fixing frame H3 is threadedly connected with a spout of the second pot liner B through the second sealing ring H4. The spout of the first pot liner A and the spout of the second pot liner B are sealed and not communicated. The water-air pump fixing frame H5 is provided with a first air hole H51 communicating with the first pot liner A and a second air hole H52 communicating with the second pot liner B. The first air hole H51 and the second air hole H52 are connected with the first pipe and the second pipe. The shell H6 is fixedly connected with the water-air pump fixing frame H5.

The first water-level sensor F and the second water-level sensor G are fixedly provided on the water-air pump fixing frame H5.

In an embodiment, the brewing chamber E provided herein includes a fixing joint E11 and a net-type box E12. The net-type box E12 is opened to allow the brewing substance to be placed. The fixing joint E11 is connected to the bottom of the second pot liner B through a buckle or a thread. The net-type box E12 is fixed by the fixing joint E11. Based on the middle channel of the fixing joint E11 and the openings of the net-type box E12, the communication between the first pot liner A and the second pot liner B is achieved.

The brewing substance is tea or coffee bag or other beverage bags.

The lid or the outer pot liner is connected with a handle.

The above are only the preferred embodiments of the present disclosure, which are not intended to limit the disclosure. Any modifications and improvements made by those skilled in the art without departing from the spirit of the disclosure should fall within the scope of the disclosure defined by the appended claims.

What is claimed is:

1. A beverage brewing method using a beverage brewing pot, the beverage brewing pot comprising a first pot liner, a second pot liner, a first water-air pump, a second water-air pump, a first three-way pipe, a second three-way pipe and a controller; a brewing chamber being arranged between the first pot liner and the second pot liner; the first pot liner, the second pot liner and the brewing chamber being in communication; at least the first pot liner being in a sealed state in an operating state; a first water-level sensor being provided at a top of the first pot liner; a second water-level sensor being provided at a top of the second pot liner; the first pot liner the first three-way pipe being communicated with the first water-air pump, a second water-air pump and the first pot liner; the second three-way pipe being communicated with the first water-air pump, a second water-air pump and the second pot liner; and the beverage brewing method comprising the following steps in a sequential manner:
(1) placing a brewing substance in the brewing chamber;
(2) feeding water to the first pot liner; and sealing the first pot liner; wherein a volume of the water is less than 95% of a volume of the first pot liner or the second pot liner;
(3) simultaneously starting the controller and the first water-air pump to feed air to the first pot liner in the sealed state such that the water in the first pot liner in the sealed state is directed to flow into the second pot liner through the brewing chamber;
(4) when the second water-level sensor of the second pot liner detects that water in the second pot liner rises to a designated water level, feeding back, by the second water-level sensor, a first signal to the controller; controlling, by the controller, the second water-air pump to feed air to the second pot liner to allow the water in the second pot liner to flow back to the first pot liner through the brewing chamber;
(5) when the first water-level sensor of the first pot liner detects that water in the first pot liner rises to a designated water level, feeding back, by the first water-level sensor, a second signal to the controller; and controlling, by the controller, the first water-air pump to feed air to the first pot liner to allow water in the first pot liner to flow into the second pot liner through the brewing chamber; and
(6) repeating steps (4)-(5) several times such that the brewing substance in the brewing chamber is fully soaked to release flavor components and is uniformly dispersed in water under action of water flow to produce a beverage.

2. The beverage brewing method of claim 1, wherein an air outlet of the first water-air pump is communicated with the first pot liner through the first three-way pipe; an air inlet of the first water-air pump is communicated with the second pot liner through the first three-way pipe; an air outlet of the second water-air pump is communicated with the second pot liner through the second three-way pipe; an air inlet of the second water-air pump is communicated with the first pot liner through the second three-way pipe; the step (3) is performed through steps of:
starting the controller and the first water-air pump simultaneously to allow the first water-air pump to feed air to the first pot liner in the sealed state so as to direct water in the first pot liner to flow into the second pot liner;

the step (4) is performed through steps of:
when the second water-level sensor of the second pot liner detects that the water in the second pot liner rises to a designated water level, feeding back, by the second water-level sensor, the first signal to the controller; controlling, by the controller, the first water-air pump to stop operating, and controlling, by the controller, the second water-air pump to feed air to the second pot liner to direct the water in the second pot liner to flow back to the first pot liner; and the step (5) is performed through steps of:
when the first water-level sensor of the first pot liner detects that the water in the first pot liner rises to a designated water level, feeding back, by the first water-level sensor, the second signal to the controller; controlling, by the controller, the second water-air pump to stop operating, and controlling, by the controller, the first water-air pump to feed air to the first pot liner to direct the water in the first pot liner to flow into the second pot liner.

3. The beverage brewing method of claim 1, wherein the first pot liner and the second pot liner are arranged up and down, or left and right, or inside and outside.

4. The beverage brewing method of claim 2, wherein the first pot liner and the second pot liner are arranged up and down, or left and right, or inside and outside.

\* \* \* \* \*